United States Patent
Jöchner

(10) Patent No.: US 10,315,856 B2
(45) Date of Patent: Jun. 11, 2019

(54) CLEANING DEVICE AND METHOD FOR CLEANING A SCREW CONVEYOR

(71) Applicant: Karl Schnell GmbH & Co. KG, Winterbach (DE)

(72) Inventor: Eugen Jöchner, Creglingen (DE)

(73) Assignee: KARL SCHNELL GMBH & CO. KG, Winterbach (DE)

( * ) Notice: Subject to any disclaimer, the term of this patent is extended or adjusted under 35 U.S.C. 154(b) by 0 days.

(21) Appl. No.: 16/103,035

(22) Filed: Aug. 14, 2018

(65) Prior Publication Data
US 2019/0062069 A1    Feb. 28, 2019

(30) Foreign Application Priority Data

Aug. 24, 2017   (DE) .................. 10 2017 119 377

(51) Int. Cl.
| | |
|---|---|
| *B65G 33/18* | (2006.01) |
| *B65G 33/24* | (2006.01) |
| *B65G 45/00* | (2006.01) |

(52) U.S. Cl.
CPC ........... *B65G 45/005* (2013.01); *B65G 33/18* (2013.01); *B65G 33/24* (2013.01); *B65G 2812/05* (2013.01)

(58) Field of Classification Search
CPC .................................................. B65G 45/005
USPC ................................ 198/494, 496, 497, 498
See application file for complete search history.

(56) References Cited

U.S. PATENT DOCUMENTS

| | | | | |
|---|---|---|---|---|
| 3,540,572 A | * | 11/1970 | McCall ................... | E21B 12/06 198/498 |
| 3,549,000 A | | 12/1970 | Christian et al. | |
| 3,782,535 A | | 1/1974 | Yousch | |
| 3,968,846 A | * | 7/1976 | Brenner .................. | E21B 12/06 175/84 |
| 4,330,032 A | | 5/1982 | Koppelman et al. | |
| 4,650,012 A | | 3/1987 | Bollinger et al. | |
| 5,242,027 A | * | 9/1993 | Blum ...................... | E21B 12/06 175/313 |
| 5,655,610 A | * | 8/1997 | Skinner .................. | E21B 12/06 175/161 |
| 6,736,722 B1 | | 5/2004 | Pope | |
| 6,749,032 B2 | * | 6/2004 | Snyder, Sr. ............. | B08B 1/00 175/84 |
| 7,614,463 B1 | * | 11/2009 | Hunziker ................ | E21B 12/06 15/256.53 |
| 9,540,887 B2 | | 1/2017 | Ditillo et al. | |

(Continued)

FOREIGN PATENT DOCUMENTS

| | | |
|---|---|---|
| DE | 119 247 A | 4/1901 |
| DE | 35 15 689 A1 | 11/1985 |
| DE | 91 15 174 U1 | 2/1992 |

(Continued)

*Primary Examiner* — William R Harp
(74) *Attorney, Agent, or Firm* — Hackler Daghighian Martino & Novak

(57) ABSTRACT

A cleaning apparatus for cleaning a conveyor screw of a screw conveyor, includes: a slide-like basic body for resting on at least two screw flights of the conveyor screw in order to displace the slide-like basic body in the axial direction by means of a rotational movement of the conveyor screw, and a cleaning device which is attached to the slide-like basic body, for cleaning the conveyor screw. The apparatus also relates to a screw conveyor and to a method for cleaning a conveyor screw of a screw conveyor.

17 Claims, 1 Drawing Sheet

(56) References Cited

U.S. PATENT DOCUMENTS

2017/0173645 A1    6/2017    Hashimoto

FOREIGN PATENT DOCUMENTS

| | | |
|---|---|---|
| DE | 42 38 730 C2 | 12/2002 |
| DK | 177030 B1 | 2/2011 |
| EP | 0 427 454 B1 | 8/1993 |
| EP | 0 744 525 | 11/1996 |
| EP | 1 367 215 A1 | 12/2003 |
| EP | 1 425 954 B1 | 5/2006 |
| EP | 2 749 729 A1 | 7/2014 |
| FR | 2 520 334 A1 | 7/1983 |
| GB | 2 365 467 A | 2/2002 |
| JP | 2008297024 A | 12/2008 |
| KR | 10 1658829 B1 | 9/2016 |
| SU | 726303 A1 | 4/1980 |

* cited by examiner

CLEANING DEVICE AND METHOD FOR CLEANING A SCREW CONVEYOR

CROSS-REFERENCE TO RELATED APPLICATIONS

This application claims priority to German Patent Application No. 10 2017 119 377.4, filed Aug. 24, 2017, the entire contents of which are hereby incorporated by reference.

DESCRIPTION

Field of the Invention

The present invention relates to a cleaning apparatus for cleaning a conveyor screw of a screw conveyor and to a screw conveyor with such a cleaning apparatus. The invention also relates to a method for cleaning a conveyor screw of a screw conveyor.

Background of the Invention

The cleaning of a conveyor screw, which is mounted in a screw trough of a screw conveyor, can take place manually, for example by means of a high-pressure cleaner. For this purpose, a podium is typically required for the operator of the high-pressure cleaner. For the cleaning of the conveyor screw and/or of the screw trough, use can also be made of automated cleaning apparatuses, in which the rotational movement of the conveyor screw is used in order to displace the cleaning apparatus along the conveyor screw in the axial direction.

DE 119 247 C describes an apparatus for cleaning transport screw troughs, which apparatus has a frame which is suspended displaceably on a guide rail, is connected in an articulated manner to a brush lying against the walls of the trough and, with arms lying against the screw flights, is pushed forward during rotation of the screw. The frame is supported by rollers running on the guide rail.

DE 42 38 730 C2 describes a device for cleaning screw flights, wherein the screw is accommodated in a closed housing. The cleaning device has cleaning elements for both sides of the screw blades in the form of scrapers and is guided both on the screw shaft and on the inner wall of the housing.

DE 91 15 174 U1 describes a device for cleaning screw conveyors, in which at least one cleaning element which is movable in the axial direction of the conveyor screw by means of the flight pitch and engages between two flights of the conveyor screw is arranged above the screw axis of each conveyor screw.

OBJECT OF THE INVENTION

It is the object of the present invention to provide a cleaning apparatus for a conveyor screw, which cleaning apparatus can be handled in a straightforward manner and which obtains a good cleaning effect.

SUMMARY OF THE INVENTION

Subject Matter of the Invention

This object is achieved by a cleaning apparatus for cleaning a conveyor screw of a screw conveyor, comprising: a slide-like basic body for resting on at least two screw flights of the conveyor screw in order to displace the slide-like basic body in the axial direction by means of a rotational movement of the conveyor screw, and a cleaning device which is attached to the slide-like basic body, for cleaning the conveyor screw.

The cleaning apparatus according to the invention has a slide-like basic body which, for the cleaning of the conveyor screw and for the cleaning of the screw trough, is placed on at least two screw flights, which are typically adjacent in the axial direction, of a screw spiral of the conveyor screw. For this purpose, the lower side of the slide-like basic body can have at least one flat supporting surface. The slide-like basic body typically has a low overall height and has such a flatness that it can also be used in a screw trough which forms a closed housing, i.e. in a screw trough, the upper side of which does not have a removable cover.

The slide-like basic body is a self-supporting, substantially solid body which can have a weight of the order of magnitude of, for example, more than approx. 10 kg or approx. 20 kg. The comparatively high dead weight stabilizes the slide-like basic body during the displacement along the conveyor screw, and therefore it is not required to additionally guide the slide-like basic body on the shaft of the conveyor screw or on a guide rail provided specially for this purpose, as is the case in the cleaning apparatuses described further above.

With the aid of the slide-like basic body which is placed onto at least two screw flights, even the region between the screw flights below the shaft of the conveyor screw is accessible for the cleaning device. With the aid of the cleaning device, it is therefore also possible for the screw trough of the screw conveyor to be cleaned together with the conveyor screw. For the cleaning of the conveyor screw over its entire length, the basic body is displaced in the manner of a slide along the conveyor screw in the axial direction by the conveyor screw being rotated about its longitudinal axis by means of a drive.

In one embodiment, the slide-like basic body has at least one abutment surface for butting against one side of a screw flight of the conveyor screw. The abutment surface reinforces the transmission of force from the conveyor screw to the slide-like basic body during the rotational movement of the conveyor screw. In the event that the slide-like basic body is intended to be moved in both directions along the conveyor screw—which requires a conveyor screw drive, the direction of rotation of which is reversible—at least two abutment surfaces are typically provided on the slide-like basic body and are brought into abutment on opposite sides of one or more screw flights.

In an advantageous embodiment, the slide-like basic body has at least one indentation in which at least one screw flight of the conveyor screw engages. The indentation is typically formed on the lower side of the basic body. The indentation can be formed, for example, between two flat supporting surfaces on the lower side of the basic body, which supporting surfaces serve for resting on two further screw flights which are arranged adjacent in the axial direction upstream or downstream of the screw flight which engages in the indentation.

In a development, the indentation has an L-shaped geometry for the engagement of an L-shaped end of a screw flight. In the event of a comparatively large length of the screw trough, it is typically required to provide one or more intermediate mountings in order to support the conveyor screw in the screw trough. In order to minimize the friction between the screw spiral and the screw trough in the region of an intermediate mounting, the screw flights arranged in the region of the intermediate mounting can have an L-shaped profile, in which a flat material extending in the axial direction is attached to the radially outer end of the screw flight, thus resulting in a profile, which is L-shaped in longitudinal section, of the screw flights provided in the region of the intermediate mounting.

In a further embodiment, the slide-like basic body has lateral guide surfaces for guiding in a screw trough of the conveyor screw. The slide-like basic body typically extends over the entire width of the screw trough in which the conveyor screw is mounted. For the lateral guidance, the slide-like basic body can have, for example, two flat lateral guide surfaces which extend substantially in the vertical direction and, for the lateral guidance of the basic body, are brought into abutment against the inner sides of the screw trough.

In a further embodiment, the cleaning apparatus comprises a body having an in particular magnetic coding for determining at least one axial end position of the slide-like basic body in a screw trough of the screw conveyor. As a rule, the slide-like basic body is placed onto the screw flights of the conveyor screw at a first end of the screw trough, i.e. in the vicinity of a first axial end position, and displaced with the aid of the conveyor screw drive in the axial direction to the other end of the screw trough, i.e. into the second axial end position, in order to clean the conveyor screw over its entire length. The body having the coding can be attached to the slide-like basic body in order to determine the current axial position of the slide-like basic body in the screw trough with the aid of, in particular, contactless position sensors. In the simplest case, the body having the magnetic coding may be a permanently magnetic body which can be detected by a magnetic position sensor.

Typically, a position sensor is fixedly installed at one end of the screw trough in order, with the aid of the coding, to detect the reaching of the axial end position by the slide-like basic body. The detection of the axial end position(s) serves for limiting the cleaning distance of the slide-like basic body in the screw trough. The contactless position sensor can be, for example, a magnetic position sensor. An optical position sensor, which detects an optical coding on the body, is also possible. The position sensor can optionally be attached to the slide-like basic body and a body having a, for example, magnetic coding can be attached to a respective axial end of the screw trough. In this case, however, an electric cable connection to the slide-like basic body is typically required and is associated with a considerable additional outlay.

In a further embodiment, the cleaning device is designed to introduce a cleaning medium into at least one intermediate space between two adjacent screw flights, on which the slide-like basic body rests. The cleaning medium is typically a fluid, i.e. a liquid or a gas. The cleaning medium in the form of a liquid, is, for example, a cleaning liquid or a rinsing liquid. The cleaning medium in the form of a gas can be, for example, compressed air. The use of a gas as cleaning medium is favourable since said gas evaporates and does not have to be disposed of as in the case of a liquid. The use of a cleaning medium in the form of compressed air or other inert gases makes it possible to detach adhesions of the product being conveyed from the conveyor screw and/or from the screw trough and subsequently to continue to use the detached product. By introducing the cleaning medium only into the intermediate space between the screw flights at which the slide-like basic body is located, the amount of cleaning agent required for the cleaning can be reduced by typically at least approx. 20% in comparison to cleaning with a high-pressure cleaner.

In a development of this embodiment, the cleaning device has at least one in particular rotating (precision) cleaning nozzle for introducing the cleaning medium into the intermediate space. The cleaning medium can be sprayed into the intermediate space with the aid of the cleaning nozzle. By means of the use of a rotating cleaning nozzle, the cleaning medium can be distributed homogeneously in the intermediate space. Alternatively, however, it is also possible to use a rigid cleaning nozzle or a combination of one or more rigid and one or more rotating cleaning nozzles. In particular, use can be made of a rotating cleaning nozzle which distributes the cleaning medium not only in a plane over an angle of 360° but, for example, distributes same over the entire surrounding three-dimensional space by the use of two axes of rotation. The cleaning nozzle(s) is/are typically spaced apart from the slide-like basic body with the aid of (a) spacer(s) and projects/project into the intermediate space between the screw flights. The cleaning nozzle(s) can be designed in particular to spray both a cleaning medium in the form of a liquid and a cleaning medium in the form of a gas into the intermediate space.

In an advantageous development of this embodiment, the cleaning device has at least two cleaning nozzles which, for the supply of the cleaning medium, are arranged on different sides of the screw shaft at different distances from the slide-like basic body. By means of the use of at least two rotating cleaning nozzles which are arranged offset with respect to each other, cleaning can take place without a "shadow", and therefore the region which would be covered by the screw shaft during the use of a cleaning nozzle can be eliminated. The two or more cleaning nozzles can also be offset with respect to one another in the axial direction. In this case, two or more cleaning nozzles for introducing a cleaning medium can be introduced into two or more intermediate spaces between different mutually adjacent screw flights.

In a further development, at least one supply duct for supplying the cleaning medium to at least one cleaning nozzle is formed in the slide-like basic body. The supply duct or the supply ducts in the basic body can open into tubular spacers to which the cleaning nozzles are attached. The cleaning medium can be supplied to the cleaning nozzles via the supply ducts and the spacers. The supply duct can have a connection at one end for a supply device for supplying the cleaning medium to the slide-like basic body.

In a further embodiment, the cleaning apparatus comprises a flow meter for measuring the flow rate of the cleaning medium introduced into the intermediate space. The flow meter can be used in particular as a flow monitor in order to identify whether the desired flow rate of the cleaning medium is achieved. If this is not the case, this indicates a clogging of the cleaning nozzles or of other components through which the cleaning medium flows. In this case, the cleaning apparatus can be checked and cleaned if required.

In a further development, the cleaning apparatus comprises a supply device, in particular a hose, for supplying the cleaning medium to the slide-like basic body. The cleaning medium can be supplied to the slide-like basic body, for example via a hose, as is the case in a high-pressure cleaner. The hose can be provided, for example, via a spring-driven or pneumatic hose reel which permits controlled unrolling of the hose and therefore adaptation of the length of the hose depending on the axial position of the slide-like basic body in the screw trough. A holding device can be attached to the inner side of the screw trough for holding the hose.

A further aspect of the invention relates to a screw conveyor, comprising: a conveyor screw, a screw trough in which the conveyor screw is mounted, a drive for rotating the conveyor screw, and a cleaning apparatus which is designed as described further above. As has been described further above, for the cleaning of the conveyor screw and of the screw trough, the slide-like basic body is placed onto at least two screw flights of the conveyor screw and displaced along the conveyor screw in the axial direction with the aid of the drive. In order to remove the (liquid) cleaning medium from the screw trough of the conveyor screw, the screw trough can be oriented in a manner inclined at an angle of typically approx. 1° or more to the horizontal. For this purpose, the screw trough can be mounted, for example, on a rack or the like.

In one embodiment, the inside of the screw trough has a holding device for holding the hose for supplying the cleaning medium to the slide-like basic body. The holding device can have a plurality of holding elements, for example in the form of open eyelets which are attached to the inside of the screw trough, are fixedly welded to the screw trough or fastened to the screw trough in some other way. The holding device or the holding elements is or are preferably arranged on the inside of the screw trough above an accumulation edge, which is located in the screw trough, in order to reduce the risk of the product, which is conveyed by the conveyor screw, getting stuck on the holding device or on the holding elements.

In a further embodiment, an in particular magnetic position sensor is attached to at least one end of the screw trough in order to detect the reaching of an axial end position of the slide-like basic body in the screw trough. As has been described further above, for this purpose the magnetic coding (or another type of coding) of the body integrated in the slide-like basic body can be detected. Instead of a magnetic position sensor, use can also be made of a different type of position sensor, for example an optical position sensor.

The invention also relates to a method for cleaning a conveyor screw of a screw conveyor, as is described further above, comprising the steps:

placing the slide-like basic body onto at least two screw flights of the conveyor screw, cleaning the conveyor screw by introducing a cleaning medium into an intermediate space between at least two of the screw flights, and (simultaneously) displacing the slide-like basic body in the axial direction of the conveyor screw by rotating the conveyor screw by means of the drive. Typically, the slide-like basic body is placed onto the screw flights of the conveyor screw at one end of the screw trough and displaced along the entire length of the conveyor screw as far as the other end of the screw trough in order to clean the entire conveyor screw. The placing on of the slide-like basic body can take place manually, but it is also possible for the placing on to take place in an automated manner, for example by means of a robot, a pivotable arm or the like. In the case of an upwardly open screw trough, the placing on of the slide-like basic body can take place directly from the upper side of the screw trough. In the case of a closed screw trough, the slide-like basic body can be inserted laterally into the screw trough and then lowered.

A variant of the method comprises the following steps: detecting the reaching of an axial end position of the slide-like basic body in the screw trough, and reversing the direction of movement of the drive for axially displacing the slide-like basic body in the opposite direction in the screw trough, wherein preferably, when the reaching of the axial end position is detected, the cleaning medium of the cleaning device is changed. If an axial end position is detected via the position sensor described further above, the direction of rotation of the drive can be reversed in order to displace the slide-like basic body in the opposite direction. The reversal of the direction of rotation of the drive can be realized in a simple manner, in particular in the case of a frequency-regulated drive. In this case, the slide-like basic body is typically displaced to the other end of the screw trough in order to be removed from the screw trough there. Alternatively, the slide-like basic body can be displaced several times between the two end positions for cleaning purposes. If the slide-like basic body is located in one end position and the direction of rotation is changed, the cleaning medium can also be changed. For example, the cleaning device can be pre-rinsed with clear water or with compressed air during the movement in the forwards direction, can be lathered in the return run with a cleaning agent, can be re-rinsed with water in the forward run, disinfected in the return run, rinsed again in the forward run and optionally in the return run, etc. During the movement of the basic body back to the axial end of the screw trough at which said basic body has been placed onto the conveyor screw, the length of the hose, which serves for supplying the cleaning medium, is also shortened, and therefore said hose can be removed from the screw trough together with the basic body without the connection of the hose to the basic body or to the hose reel having to be released for this purpose.

Further advantages of the invention emerge from the description and the drawing. The features mentioned above and those which have yet to be explained further can also be used by themselves or as a plurality in any desired combination. The embodiment shown and described should not be understood as a definitive enumeration, but rather, on the contrary, have an exemplary character for describing the invention.

DETAILED DESCRIPTION OF THE PREFERRED EMBODIMENTS

Figure 1:
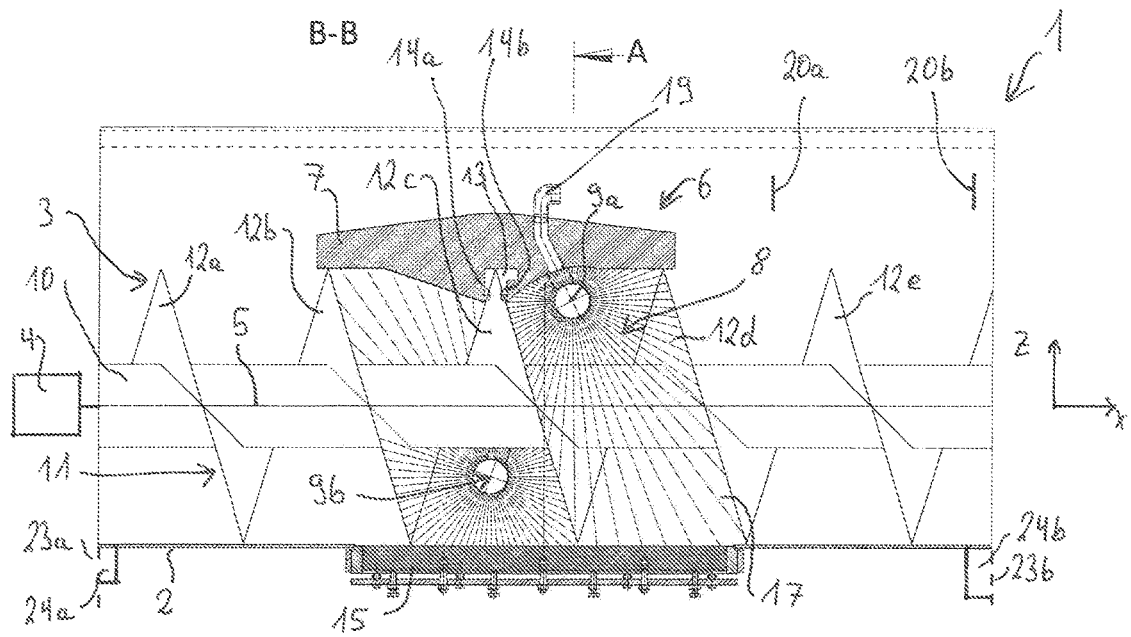
FIG. 1 shows a schematic illustration of a screw conveyor with a cleaning apparatus, which has a slide-like basic body, in a longitudinal section.
Figure 2:
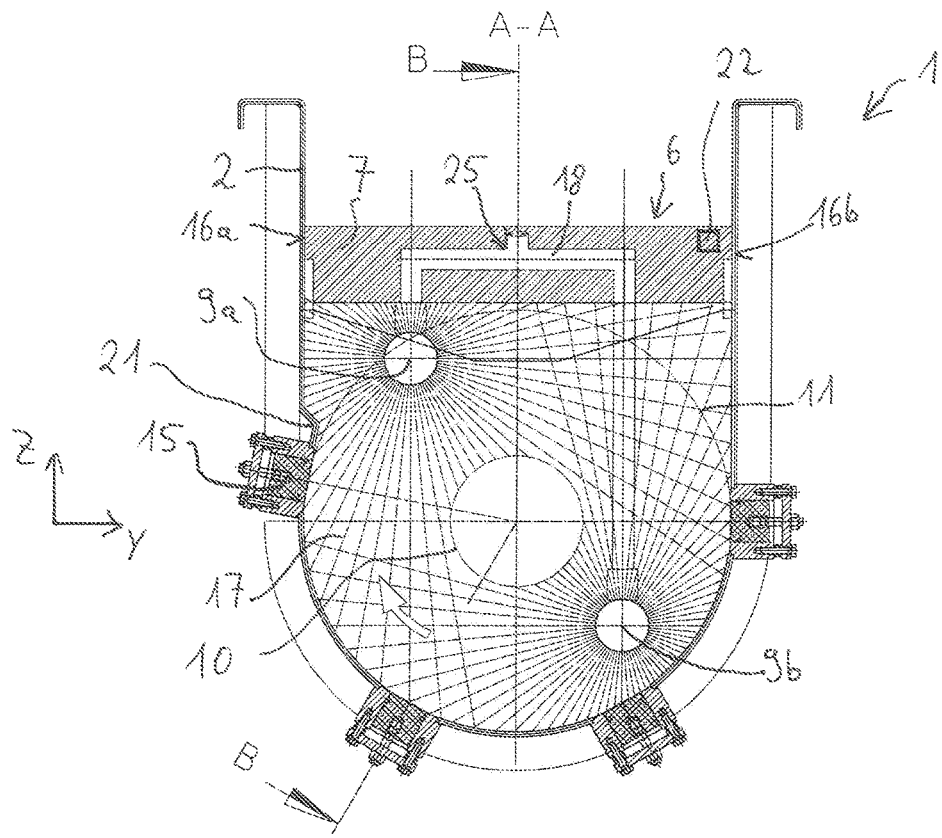
FIG. 2 shows a schematic illustration of the screw conveyor of FIG. 1 in a cross section.

FIG. 1 and FIG. 2 show a screw conveyor 1 which has a screw trough 2 in which a conveyor screw 3 is mounted. The screw conveyor 1 has a drive 4 in order to rotate the conveyor screw 3 about its longitudinal axis 5, as indicated in FIG. 2 by an arrow. The screw conveyor 1 also has a cleaning apparatus 6 which comprises a slide-like basic body 7 and a cleaning device 8 with two cleaning nozzles 9a, 9b, which cleaning device is attached to the slide-like basic body 7.

The conveyor screw 3 has a screw shaft 10 with a helical screw spiral 11 having a plurality of screw flights 12a-e. For simplification purposes, only five screw flights 12a-e are pictorially illustrated in FIG. 1. As can be seen in FIG. 1, the slide-like basic body 7 rests on three screw flights 12b-d of the screw spiral 11 that are consecutive in the axial direction, i.e. along the longitudinal axis 5 of the conveyor screw 3. The slide-like basic body 7 can be displaced along the longitudinal axis 5 of the conveyor screw 3 by the drive 4 of the screw conveyor 1 being activated in order to rotate the conveyor screw 3 about the longitudinal axis 5.

For the stabilization of the slide-like basic body 7 during the movement along the longitudinal axis 5 of the conveyor screw 3, said basic body, in addition to a comparatively high weight of the order of magnitude of approx. 10 kg, 20 kg or more, has an indentation 13 in which the central screw flight 12c of the conveyor screw 3 engages. As can be seen in FIG. 1, the indentation 13 has a profile which is L-shaped in longitudinal section, or an L-shaped geometry. The indentation 13 is adapted to an L-shaped profile (not illustrated pictorially) of the radially outer end of the central screw flight 12c, which profile is used in the region of an intermediate mounting of the conveyor screw 3 in the screw trough 2 in order to reduce the friction with rod-shaped mounting elements 15 attached to the screw trough 2 in the region of the intermediate mounting.

The indentation 13 has two abutment surfaces 14a, 14b which run in the vertical direction, lie against the mutually opposite sides of the central screw flight 12c and improve the transmission of force to the slide-like basic body 7 during the movement along the longitudinal axis 5 of the conveyor screw 3. For the stabilization of the slide-like basic body 7 during the displacement, said basic body has lateral guide surfaces 16a, 16b (illustrated in FIG. 2) which are oriented parallel and lie against the inner walls of the screw trough 2, said inner walls extending in the vertical direction.

In order to clean the screw trough 2 and the conveyor screw 3, a cleaning medium 17 is introduced via the two cleaning nozzles 9a, 9b both into an intermediate space between the first and second screw flight 12b, 12c and between the second and third screw flight 12c, 12d, on which the slide-like basic body 7 rests. The cleaning nozzles 9a, 9b are rotational cleaning nozzles 9a, 9b which distribute the cleaning medium 17 in all directions, as is illustrated in FIG. 1 and in FIG. 2 with reference to the lines emerging from the centre of the respective cleaning nozzle 9a, 9b.

In order to ensure that the screw flights 12a-e can be completely cleaned, it is required for the cleaning medium 17 to be able to pass to all locations in the intermediate spaces. In order to make this possible, the first cleaning nozzle 9a and the second cleaning nozzle 9b are spaced apart at different distances in the vertical direction Z from the slide-like basic body 7. The respective distance in the vertical direction Z is selected in such a manner that the first cleaning nozzle 9a is positioned above the screw shaft 10 while the second cleaning nozzle 9b is positioned below the screw shaft 10. In addition, the two cleaning nozzles 9a, 9b are also offset with respect to each other in the longitudinal direction of the conveyor screw 3, i.e. in the X direction, and in the Y direction. By means of the offset arrangement of the cleaning nozzles 9a, 9b, a "shadow" during the cleaning can be avoided, which shadow would be caused by the screw shaft 10 when only a single cleaning nozzle is used.

For supplying the cleaning medium 17 to the cleaning nozzles 9a, 9b, the slide-like basic body 7 has a supply duct 18 which, starting from a connection for a supply device, branches off in the form of a hose 19 in order to supply the cleaning medium 17 to the two cleaning nozzles 9a, 9b. Of the hose 19, only one end is illustrated in FIG. 1, at which said hose is connected to the supply duct 18. The hose 19 is guided on a holding device which, in the example shown, is formed by holding elements in the form of eyelets 20a, 20b, . . . which are attached to the inside of the screw trough 2 and which form a horizontal guide for the hose 19. The eyelets 20a, 20b, . . . are upwardly open and serve to support the hose 19 during the displacement in the longitudinal direction 5 of the conveyor screw 3. The hose 19 is provided by a spring-driven or pneumatic hose reel (not illustrated pictorially).

The eyelets 20a, 20b, . . . are formed on one side of the screw trough 2, on which an accumulation edge 21 (illustrated in FIG. 2) is provided, which is intended to prevent the product conveyed by means of the conveyor screw 3 from being carried along upwards beyond the accumulation edge 21. The eyelets 20a, 20b are attached to the inside of the screw trough 2 above the accumulation edge 21 in order to prevent said eyelets from being soiled by the product conveyed by the conveyor screw 3. For the removal of the cleaning medium 17, it is advantageous if the screw trough 2 has a slight slope, i.e. if the screw trough 2 is inclined by an angle of typically more than approx. 1° in relation to the horizontal, which can be achieved, for example, by means of a rack.

A body 22 (illustrated schematically in FIG. 2) having a magnetic coding is formed in the slide-like basic body 7, said body 22 permitting contactless measurement of the position of the slide-like basic body 7 in the longitudinal direction 5 of the conveyor screw 3 (i.e. in the X direction). The body 22 is formed from a permanently magnetic material and makes it possible in particular to identify when the slide-like basic body 7 has reached one of the two ends of the screw trough 2, i.e. when the slide-like basic body 7 reaches one of the two axial end positions 23a, 23b. In the example shown, for said identification, magnetic position sensors 24a, 24b which are arranged in a fixed position are attached to the two axial ends of the screw trough 2 and detect the reaching of the respective axial end position 23a, 23b by the slide-like basic body 7 with reference to the magnetic coding of the body 22. With the aid of such position sensors and a suitable control device, the cleaning distance of the slide-like basic body 7 can be limited.

If the slide-like basic body 7 is placed at a first, for example lower end of the screw trough 2 onto the screw flights arranged there, and, if it is detected with the aid of the body 22 that the slide-like basic body 7 has reached the second, for example upper end of the screw trough 2, the slide-like basic body 7 can be lifted off at the second end from the conveyor screw 3, and the cleaning operation is ended. In the case of an upwardly open screw trough 2, the hose 19 can also be removed from the screw trough 2 as the slide-like basic body 7 is being removed, and the length of the hose can be reduced by means of the hose reel. The slide-like basic body 7 can subsequently be placed again at the lower end of the screw trough 2 onto the screw flights located therein in order to carry out a further cleaning step.

For the situation in which the drive 4 of the screw conveyor 1 permits a reversal of the direction of rotation, during or after the detecting of the second upper end position 23b, the direction of rotation of the conveyor screw 3 is reversed, and therefore the slide-like basic body 7 can be displaced in the opposite direction in the screw trough 2 until said basic body again reaches the first lower end position 23a. When the direction of rotation of the conveyor screw 3 is changed, the cleaning medium can be changed. For example, in a first cleaning step during the forwards movement of the slide-like basic body 7, a cleaning medium in the form of a rinsing medium, e.g. in the form of clear water or in the form of compressed air, can be used, while, during the rearwards movement, a cleaning medium in the form of a cleaning foam is used, etc. Both the placing on and the removal of the slide-like basic body 7 onto/from the conveyor screw 3 can take place manually or in an automated manner, for example using a pneumatic lifting arm, a robot arm or the like.

For measuring the flow rate of the cleaning medium 17, which is introduced into the respective intermediate spaces between the screw flights 12*a-e*, the slide-like basic body 7 has a flow meter 25 at the supply duct 18. It has proven advantageous if the flow or the flow rate of the cleaning medium 17 is monitored in order to determine whether the cleaning nozzles 9*a*, 9*b*, of the supply duct 18 formed in the slide-like basic body 7 or possibly the hose 19 are/is partially clogged by impurities from the product being transported by the screw conveyor 1 (for example sausage meat or the like), such that the flow rate is reduced. When a reduced flow rate is detected, the cleaning duration can optionally be extended, or additional cleaning steps can be performed in order to clean the conveyor screw 3 of the screw conveyor 1.

What is claimed is:

1. A cleaning apparatus for cleaning a conveyor screw of a screw conveyor, the cleaning apparatus comprising:
    a slide-like basic body for resting on at least two screw flights of the conveyor screw to displace the slide-like basic body in the axial direction by means of a rotational movement of the conveyor screw; and
    a cleaning device which is attached to the slide-like basic body, for cleaning the conveyor screw.

2. The cleaning apparatus according to claim 1, wherein the slide-like basic body has at least one abutment surface for butting against one side of a screw flight of the conveyor screw.

3. The cleaning apparatus according to claim 2, wherein the slide-like basic body has at least one indentation in which at least one screw flight of the conveyor screw engages.

4. The cleaning apparatus according to claim 3, wherein the indentation has an L-shaped geometry for the engagement of an L-shaped end of a screw flight.

5. The cleaning apparatus according to claim 1, wherein the slide-like basic body has lateral guide surfaces for guiding in a screw trough of the conveyor screw.

6. The cleaning apparatus according to claim 1, further comprising a body having an in particular magnetic coding for determining at least one axial end position of the slide-like basic body in a screw trough of the screw conveyor.

7. The cleaning apparatus according to claim 1, wherein the cleaning device is designed to introduce a cleaning medium into at least one intermediate space between two adjacent screw flights.

8. The cleaning apparatus according to claim 7, wherein the cleaning device has at least one in particular rotating cleaning nozzle for introducing the cleaning medium into the intermediate space.

9. The cleaning apparatus according to claim 8, wherein the cleaning device has at least two cleaning nozzles which, for the supply of the cleaning medium, are arranged on different sides of the screw shaft at different distances from the slide-like basic body.

10. The cleaning apparatus according to claim 8, wherein at least one supply duct for supplying the cleaning medium to at least one cleaning nozzle is formed in the slide-like basic body.

11. The cleaning apparatus according to claim 7, further comprising a flow meter for measuring the flow rate of the cleaning medium introduced into the intermediate space.

12. The cleaning apparatus according to claim 7, further comprising a supply device, in particular a hose, for feeding the cleaning medium to the slide-like basic body.

13. A screw conveyor, comprising:
    a conveyor screw;
    a screw trough in which the conveyor screw is mounted;
    a drive (4) for rotating the conveyor screw; and
    a cleaning apparatus according to claim 1.

14. The screw conveyor according to claim 13, wherein the inside of the screw trough has a holding device for holding the hose for supplying the cleaning medium to the slide-like basic body.

15. The screw conveyor according to claim 13, wherein an in particular magnetic position sensor is attached to at least one end of the screw trough in order to detect the reaching of an axial end position of the slide-like basic body in the screw trough.

16. A method for cleaning a conveyor screw of a screw conveyor according to claim 13, the method comprising the steps of:
    placing the slide-like basic body onto at least two screw flights of the conveyor screw;
    cleaning the conveyor screw by introducing a cleaning medium into an intermediate space between at least two of the screw flights; and
    displacing the slide-like basic body in the axial direction of the conveyor screw by rotating the conveyor screw by means of the drive.

17. The method according to claim 16, further comprising the steps of:
    detecting the reaching of an axial end position of the slide-like basic body in the screw trough; and
    reversing the direction of rotation of the drive for axially displacing the slide-like basic body in the opposite direction in the screw trough, wherein preferably, when the reaching of the axial end position is detected, the cleaning medium is changed.

\* \* \* \* \*